UNITED STATES PATENT OFFICE.

WALTHER BÖLSTERLI, OF WINTERTHUR, SWITZERLAND.

PROCESS OF PRODUCING SOLUTIONS CONTAINING PURE SILVER SALT.

No. 809,278.      Specification of Letters Patent.      Patented Jan. 9, 1906.

Application filed July 6, 1905. Serial No. 268,572.

*To all whom it may concern:*

Be it known that I, WALTHER BÖLSTERLI, a citizen of the Swiss Republic, and a resident of Winterthur, Switzerland, have invented certain new and useful Improvements in Processes of Producing Solutions Containing Pure Silver Salt, of which the following is a specification.

This invention has for its object a process of producing a solution containing pure silver salt, which by merely being rubbed upon the clean surface of the object to be silvered will form on the same a deposit of metallic fine silver, so that this solution can serve as a substitute for galvanic silvering or electroplating.

This solution is produced in the following way: In about thirty liters of water 0.8 kilogram of silver salt (argentic nitrate, $AgNO_3$,) is dissolved. This is precipitated as chlorid with diluted hydrochloric acid of twelve per cent. and the deposit, ($AgCl$,) washed. The following chemical formula characterizes the chemical process:

$$AgNO_3 + HCl = AgCl + HNO_3.$$

Now a reducing solution of about thirty liters of water and 3.3 kilograms of hyposulfite of soda is prepared and in this the precipitated chlorid of silver is dissolved while being constantly stirred. With this solution are mixed, while the same is being stirred, 1.8 kilograms of caustic ammonia, (eight per cent.,) and thereupon eight kilograms of finely-triturated Spanish whiting, whereby double salts are formed of which, for instance, the following can be traced:

$$Ag_2S_2O_3 \text{ and } Ag_2S_2O_3Na_2S_2O_3H_2O.$$

The solution thus obtained forms, with these double salts, on being rubbed upon the clean surfaces of the objects to be silvered by means of buckskin or linen cloth (on recessed parts with a brush) or being rubbed in until it becomes dry and washed afterward with water and then rubbed dry with a woolen rag a brilliant deposit of metallic fine silver.

The solution is especially suited for polishing or silvering plates, instruments, or knives, forks, and spoons of argentan, argonite, Christofel, Britannia, German silver, and the like; but it can also be used for improving all kinds of objects of fine silver, which by thus being coated with a layer of genuine fine silver are thereby protected against wasting or wearing off, whereas other polishes, on the contrary, hasten the wear or directly cause it, as well as for silvering knicknacks and decorative objects of copper and brass. Of great importance is the use of this solution for hotels and restaurants. Beer-pumps or beer-fountains are first to be cleaned with soda water.

What I claim as my invention, and desire to secure by United States Letters Patent, is—

The herein-described process of producing a solution containing pure silver salt, consisting in dissolving in about thirty liters of water 0.8 kilogram of silver salts, which are then precipitated as chlorid with diluted hydrochloric acid of twelve per cent. and the deposit washed out, whereupon in a reducing solution of about thirty liters of water and 3.3 kilograms of hyposulfite of soda the precipitated chlorid of silver is dissolved while being constantly stirred and with this solution are mixed, while the same is being stirred, first 1.8 kilograms of caustic ammonia of eight per cent. and then eight kilograms of finely-triturated Spanish whiting, whereby double salts are formed of which the following can be traced:

$$Ag_2S_2O_3 \text{ and } Ag_2S_2O_3Na_2S_2O_3H_2O,$$

substantially as and for the purpose set forth.

In testimony whereof I have signed my name to this specification in the presence of two subscribing witnesses.

WALTHER BÖLSTERLI.

Witnesses:
    PAUL WEISE,
    ALFRED VIOLAND.